(12) United States Patent
Sutton et al.

(10) Patent No.: US 9,702,146 B2
(45) Date of Patent: Jul. 11, 2017

(54) ARCHITECTURAL PANELS INCLUDING ELONGATED THERMOPLASTIC MEMBERS

(75) Inventors: Matthew T. Sutton, Salt Lake City, UT (US); John E. C. Willham, Sandy, UT (US); Charles H. Moore, Salt Lake City, UT (US)

(73) Assignee: 3Form, LLC, Salt Lake City, UT (US)

( * ) Notice: Subject to any disclaimer, the term of this patent is extended or adjusted under 35 U.S.C. 154(b) by 0 days.

(21) Appl. No.: 14/116,335

(22) PCT Filed: May 10, 2012

(86) PCT No.: PCT/US2012/037382
§ 371 (c)(1),
(2), (4) Date: Nov. 7, 2013

(87) PCT Pub. No.: WO2012/158472
PCT Pub. Date: Nov. 22, 2012

(65) Prior Publication Data
US 2014/0065341 A1   Mar. 6, 2014

Related U.S. Application Data

(60) Provisional application No. 61/486,060, filed on May 13, 2011.

(51) Int. Cl.
*E04C 2/20* (2006.01)
*E04C 2/30* (2006.01)
(Continued)

(52) U.S. Cl.
CPC ............. *E04C 2/20* (2013.01); *B29C 43/02* (2013.01); *Y10T 428/18* (2015.01); *Y10T 428/24802* (2015.01)

(58) Field of Classification Search
CPC ..... E04C 2/00; E04C 2/10; E04C 2/20; E04C 2/24; E04C 2002/00; E04C 2002/02;
(Continued)

(56) References Cited

U.S. PATENT DOCUMENTS 3,889,032 A * 6/1975 Koelsch ................ B29C 67/222
264/126
4,045,603 A   8/1977 Smith
(Continued)

FOREIGN PATENT DOCUMENTS

| JP | 05044148 | 2/1993 |
|---|---|---|
| JP | 2007144747 | 6/2007 |
| KR | 1020080028927 | 4/2008 |

OTHER PUBLICATIONS

International Search Report and Written Opinion for PCT/US2012/037382 mailed Nov. 23, 2012.
(Continued)

*Primary Examiner* — Joanna Pleszczynska
(74) *Attorney, Agent, or Firm* — Workman Nydegger (57) ABSTRACT

Implementations of the present invention relate to for incorporating virgin or recycled thermoplastic resin materials into architectural thermoplastic panels that have ordered and reproducible geometric patterns. More specifically, at least one implementation provides a method for fusing thermoplastic elongated members, such as circular rods and rectangular bars, sourced from recycled thermoplastic resin to form the architectural thermoplastic panels.

24 Claims, 8 Drawing Sheets (51) Int. Cl.
  *B32B 27/00* (2006.01)
  *B32B 5/00* (2006.01)
  *B29C 43/02* (2006.01)

(58) Field of Classification Search
  CPC ..... E04C 2/30; E04C 2/36; E04C 2/54; B32B 27/08; B32B 2250/24; B32B 2419/00; B32B 2451/00; B32B 2607/00; B32B 27/00; B32B 5/00; Y10T 428/18; Y10T 428/24802
  USPC ....... 428/55, 56, 195.1, 201, 542.2, 116, 54; 52/309.1, 311.1, 311.2
  See application file for complete search history.

(56) References Cited

U.S. PATENT DOCUMENTS

| | | | | |
|---|---|---|---|---|
| 4,188,316 | A | * | 2/1980 | Sawada .................... 524/779 |
| 5,942,307 | A | * | 8/1999 | Hellermann et al. ......... 428/116 |
| 6,391,456 | B1 | * | 5/2002 | Krishnaswamy et al. . 428/411.1 |
| 6,571,523 | B2 | * | 6/2003 | Chambers ................ E04B 1/14 52/270 |
| 2006/0058404 | A1 | * | 3/2006 | Meyers et al. ................. 521/40 |
| 2007/0234651 | A1 | * | 10/2007 | Gage ........................ E04B 1/02 52/173.2 |

OTHER PUBLICATIONS

International Preliminary Report on Patentability for PCT/US2012/037382 mailed Nov. 28, 2013.

* cited by examiner

ARCHITECTURAL PANELS INCLUDING ELONGATED THERMOPLASTIC MEMBERS

CROSS-REFERENCE TO RELATED APPLICATIONS

The present invention is a 35 U.S.C. §371 U.S. National Stage of PCT Application No. PCT/US2012/037382 filed May 10, 2012, entitled, "Architectural Panels Including Elongated Thermoplastic Members and Methods of Making the Same," which claims the benefit of priority to U.S. Provisional Application No. 61/486,060, filed May 13, 2011, entitled "Building Panels Produced from Rods, Bars or Plank Profiles and Processes Thereof." The entire content of each of the aforementioned patent applications is incorporated by reference herein.

BACKGROUND OF THE INVENTION

1. The Field of the Invention

This invention relates to apparatus, systems, and methods for fabricating panels from thermoplastic materials. More particularly, the present invention relates to forming decorative resin panels from elongated thermoplastic materials.

2. Background and Relevant Art

Conventional recycling mechanisms typically involve recovering post-consumer waste products, extracting raw material from the recovered products, and using the extracted material to create new products. By way of illustration, manufacturers often use a polymer raw material, such as high-density polyethylene (HDPE), which has been extracted from post-consumer waste containers (e.g., milk jugs and detergent bottles) to create new, similar containers. Due to the eventual breakdown of the raw material caused by repeated processing, however, manufacturers often use only a small portion (e.g., thirty percent) of post-consumer waste in the production of new products to maintain integrity of the desired finished good. Thus, while conventional recycling mechanisms reduce waste, they leave room for greater efficiency.

It is therefore desirable to recycle post-consumer waste, such as HDPE and similar thermoplastics, in a manner that produces a higher-value product having a long service life, and that can use up to one hundred percent post-consumer material. One application of post-consumer waste that meets these desires is the fabrication of panels as building materials, usable for structural and/or aesthetic purposes, such as doors, walls, floors, tables, etc. Production of panels with post-consumer thermoplastics, such as HDPE, conventionally involves the use of raw post-consumer material in the form of flakes or pellets having various colors, shapes, and sizes. When melted with heat and pressure such flakes and pellets form panels with random patterns of different colored flakes within the panel.

When employing the foregoing techniques it becomes difficult, if not impossible, to produce panels having linear, repeating, and reproducible patterns. Furthermore, the heating and pressing process can lead to smearing of various colors on the surface of the panel. In some instances, the manufacturer can remove an outer layer of the panel and/or re-press the panel to apply texture to clear smeared elements from the panel. Such modifications to the panel, however, can be time-consuming and/or cost prohibitive. Depending on the particular application, smearing and/or random flake and color patterns may be undesirable to the builder or architect. Similar problems can arise when forming panels from virgin resin materials.

Conventional petroleum-derived polymer products are often sent to a landfill due, at least in part, to the fact that products are not previously easily incorporated into existing recycling streams. This is a particular problem for the environment, as resin materials do not typically break down or degrade for significant time durations. Not only do resin materials degrade at poor rates, but the source of some common resins (i.e., fossil-based hydrocarbons, such as petroleum), is generally thought to be non-replenishing, and continually under pressure of exhaustion and market instability. Because material manufacturers typically derive thermoplastic materials from petrochemicals, supply of which may be limited, decrease in supply and/or increase in prices of petrochemicals can lead to prices increases for thermoplastic materials.

Accordingly, there are a number of disadvantages in incorporating thermoplastic resin materials into new building products that can be addressed.

BRIEF SUMMARY OF THE INVENTION

Implementations of the present invention solve one or more of the foregoing or other problems in the art with systems, methods, and apparatus for incorporating elongated thermoplastic resin materials into architectural thermoplastic panels that have ordered and reproducible geometric patterns. More specifically, at least one implementation provides a method for fusing thermoplastic elongated members, such as circular rods and rectangular bars, sourced from recycled or virgin thermoplastic resins, into the architectural thermoplastic panel. In particular, a manufacturer can fabricate architectural thermoplastic panels from the thermoplastic elongated members by heating and pressing together the thermoplastic elongated members.

One or more implementations include a method of manufacturing an architectural thermoplastic panel involving laying out a plurality of thermoplastic elongated members. Additionally, the method includes abutting adjacent thermoplastic elongated members of the plurality of thermoplastic elongated members together to form one or more layup layers. Furthermore, the method includes applying a combination of heat and pressure to the one or more layup layers until the plurality of thermoplastic elongated members fuse together. The method also involves cooling the fused thermoplastic elongated members to form the architectural thermoplastic panel.

At least one implementation includes an architectural thermoplastic panel formed from elongated thermoplastic resin members. The architectural thermoplastic panel includes a plurality of thermoplastic elongated members fused together. The plurality of thermoplastic elongated members comprise a first thermoplastic elongated member having a first color, and a second thermoplastic elongated member having a second color differing from the first color. The first and the second thermoplastic elongated members abut each other and are fused together along their lengths. Furthermore, the first and the second colors do not bleed into each other.

Additional implementations also include an architectural thermoplastic panel formed from thermoplastic material. Such architectural thermoplastic panel has a substantially reproducible and ordered geometric pattern without substantial smearing. The method architectural thermoplastic panel includes a plurality of thermoplastic elongated members fused together. The plurality of thermoplastic elongated members comprise thermoplastic elongated members having at least two different colors. Also, the plurality of thermoplastic elongated members form at least a front surface of the architectural thermoplastic panel. Moreover, the front surface of the architectural thermoplastic panel is substantially planar, and the front surface of the architectural thermoplastic panel comprises a plurality of linear segments defined by the at least two different colors.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention provide systems, methods, and apparatus for incorporating elongated thermoplastic resin materials into architectural thermoplastic panels that have ordered and reproducible geometric patterns. More specifically, at least one implementation provides a method for fusing thermoplastic elongated members, such as circular rods and rectangular bars, sourced from recycled or virgin thermoplastic resins, into the architectural thermoplastic panel. In particular, a manufacturer can fabricate architectural thermoplastic panels from the thermoplastic elongated members by heating and pressing together the thermoplastic elongated members.

In general, and as understood more fully herein, a manufacturer can produce architectural thermoplastic panels using thermoplastic elongated members. For instance, the manufacturer can form the architectural thermoplastic panels using circular rods and/or rectangular bars, which may comprise virgin thermoplastic materials, recycled thermoplastic materials, or combinations thereof. Additionally or alternatively, the manufacturer can incorporate other elements and/or materials into the architectural thermoplastic panel. Particularly, the manufacturer can fabricate architectural thermoplastic panels by fusing thermoplastic elongated members together using heat and pressure.

As such, a part, or even all, of the resin material forming the architectural thermoplastic panels can comprise post-consumer recycled material. Reuse of resin material can yield gains for the manufacturer, for consumers, for the environment, and for others. Gains include, for example, cost savings for manufacturers and consumers brought about through an overall reduction in the amount of source resin material required to produce resin panels. Gains also include benefits to the environment and to society as a whole brought about by a reduction in waste and a reduction in the use of fossil-based hydrocarbon resources when producing resin panels. The production of resin panels with recycled content can also generate goodwill for the manufacturer and for consumers using the panels, and can expand the market for resin panels to include the growing community of environmentally-conscious consumers.

In addition, producing resin panels having a high percentage of recycled resin content can help manufacturers and consumers alike meet professional certification with environmentally-conscious organizations. Many manufacturers, suppliers, architects, designers, and other businesses favor manufacturing methods and materials that exhibit environmental stewardship and responsibility. For example, LEADERSHIP IN ENERGY AND ENVIRONMENTAL DESIGN (LEED) certification tallies points for environmentally sound building practices, such as the use of recycled industrial waste, in a building project. LEED provides more points for use of higher percentages of recycled content, which can contribute to a "Green Building" certification, a designation that is important as a value-add for many designers, architects, and building owners. Material suppliers that offer building supplies with recycled material content may enjoy a significant market advantage over their competitors as environmental concerns and certifications continue to become an important part of material specification.

Additionally, the manufacturer and/or builder can use the architectural thermoplastic panels for forming various structural, functional, and decorative structures. For example, the manufacturer can combine multiple architectural thermoplastic panels with various hardware, such as posts, stand-offs, and/or other mounting hardware, to form partitions, barriers, dividers, support surfaces, and combinations thereof. Furthermore, in at least one implementation, the architectural thermoplastic panels forming the various structural, functional, and/or decorative structures can have ordered and/or reproducible pattern. Accordingly, the builder can use various architectural thermoplastic panels to provide a desired architectural environment for occupants of the building.

In addition to the foregoing, the use of thermoplastic elongated members or extrusions can allow a manufacturer to produce panels having repeatable patterns with a great degree of precision. In particular, the apparatus and methods described herein below can allow a finished panel to retain the pattern/layout/design of a layup assembly of thermoplastic elongated members. In particular, one or more implementations can reduce or eliminate smearing and other defects commonly associated with panels formed from recycled materials.

In one or more implementations, the manufacturer can use recycled or virgin thermoplastic resin flakes and/or pellets to form thermoplastic elongated members, such as cylindrical rods, rectangular bars, etc. For example, the manufacturer can melt the virgin or recycled thermoplastic resin flakes and/or pellets and extrude molten material through an extrusion die that can provide a desired shape to the extrusion. In other words, the extrusion die can provide the shape of the thermoplastic elongated members (e.g., cylindrical rods, rectangular bars, etc). Furthermore, the manufacturer also can produce thermoplastic elongated members that have a substantially uniform color, by adding desired colorants to the virgin or recycled thermoplastic resin flakes and/or pellets (e.g., during extrusion).

Figure 1A:
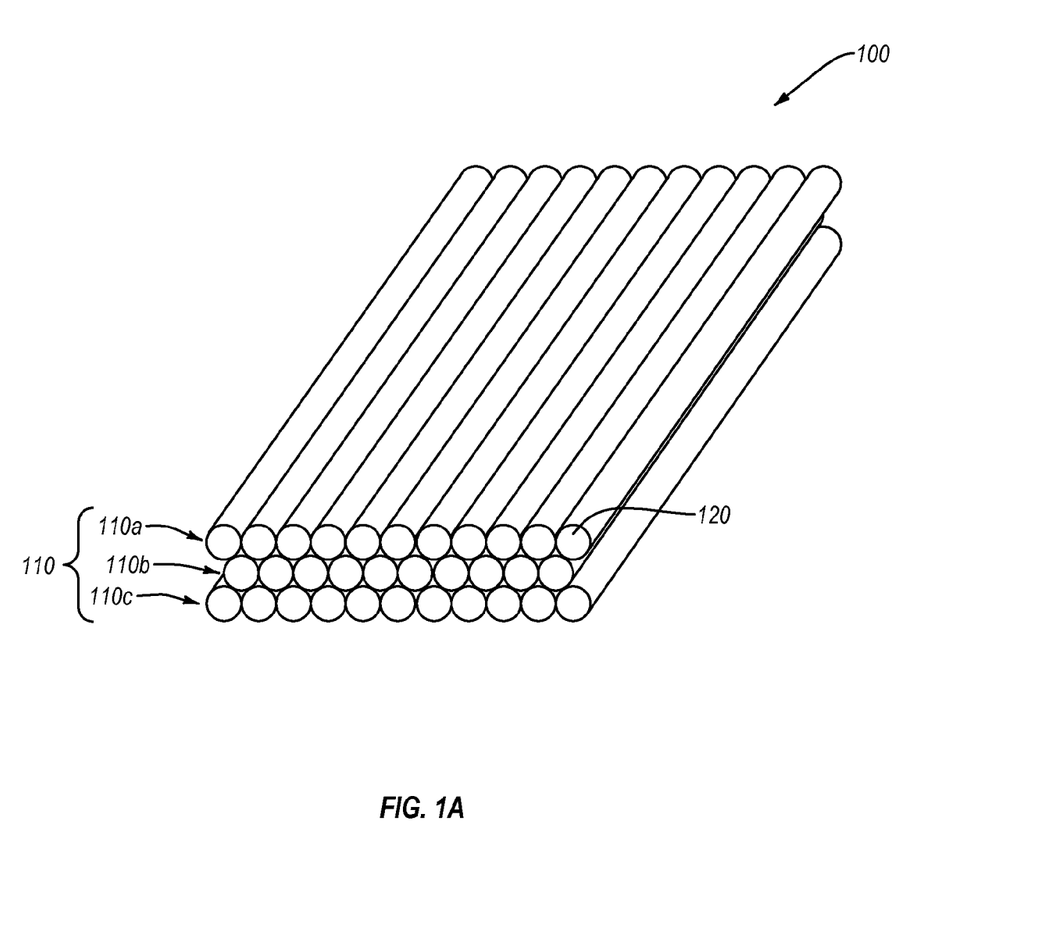
FIG. 1A illustrates a perspective view of a layup assembly of thermoplastic elongated members in accordance with an implementation of the present invention.

In any event, a manufacturer can incorporate and/or combine multiple thermoplastic elongated members comprising thermoplastic resin to fabricate architectural thermoplastic panels. For example, FIG. 1A illustrates a layup assembly 100 to which a manufacturer can apply heat and pressure to form an architectural thermoplastic panel. The layup assembly 100 can comprise a plurality of thermoplastic elongated members 120.

The thermoplastic elongated members 120 may comprise any number of different polymers (i.e., thermoplastic resins). For example, the thermoplastic elongated members 120 may comprise high density polyethylene (HDPE), low density polyethylene (LDPE), polypropylene (PP), polyethylene terephthalate (PETE), Vinyl/Polyvinyl Chloride (PVC), Polystyrene (PS), Polyethylene Terephthalate (PET), glycol-modified PET (PETG), Polymethyl Methacrylate (PMMA), and Polycarbonate (PC) to name a few. Furthermore, the thermoplastic substrates or thermoplastic sheets, described below, also can comprise recycled and/or virgin thermoplastic material identified above as well as similar thermoplastic materials. Additionally, thermoplastic elongated members as well as the thermoplastic resin substrates also can comprise other thermoplastic polymers or thermoplastic polymer blends, or combinations and mixtures thereof. In addition, any given resin substrate or sheet can incorporate any number other layers or coatings.

Additionally or alternatively, the layup assembly 100 also can include elongated members comprising other materials, such as glass, wood, metal, organic objects, etc. For instance, the layup assembly 100 can include one or more metal, wood, or glass rods. In at least one implementation; however, all of the elongated members comprise recycled thermoplastic resins.

Each thermoplastic elongated member 120 can have a uniform color or can comprise multiple colors. Furthermore, different thermoplastic elongated member 120 can comprise differing colors. A manufacturer can, therefore, create distinct patterns with thermoplastic elongated members 120 of differing colors. Accordingly, the layup assembly 100 can have various patterns formed and/or defined by the arrangement of the thermoplastic elongated members. As such, the manufacturer can arrange the thermoplastic elongated members in any number of ways to produce one or more desired patterns. It should be noted that, as used herein, the term "pattern" refers to a particular arrangement of elongated members that forms ordered and/or reproducible designs, which may or may not be repeated in the layup assembly 100 or the architectural thermoplastic panel. In other words, an entire panel can form a pattern or a segment of a panel can comprise a pattern that is repeated along the panel.

As shown in FIG. 1A, in one or more implementations the thermoplastic elongated members 120 can comprise rods. In other words, the thermoplastic elongated members 120 can comprise a circular cross-section. In alternative implementations, the thermoplastic elongated members can include square, triangular, rectangular, oval, or other shaped cross-sections. In any event, the thermoplastic elongated members 120 can include a length to diameter ratio of at least about 2 to 1. In alternative implementations, the thermoplastic elongated members have length to diameter ratio between about 5 to 1 and about 100 to 1.

The layup assembly 100 can include one or more layup layers 110 of thermoplastic elongated members 120. For example, FIG. 1A illustrates that the layup assembly 100 can include three layup layers 110a, 110b, 110c. In alternative implementations, the layup assembly 100 can include a single layup layer, two layup layers, or more than three layup layers.

One will appreciate in light of the disclosure herein that a manufacturer can lay out a layup assembly 100 and the layup layers 110 thereof in any number of different configurations. For example, the length, width, and gauge of a resultant panel can correspond to the length, width, and gauge of the layup assembly 100. Thus, when a thicker panel is desired, the layup assembly 100 can include multiple rows of thermoplastic elongated members 120 or thicker thermoplastic elongated members 120.

A manufacturer can stack the layup layers 110 so the thermoplastic elongated members 120 are stacked directly one on top of the other. In other words, the centerlines of the thermoplastic rods 120 in a first layup layer can align approximately with the centerlines of the thermoplastic rods 120 in an adjacent layup layer. Additionally or alternatively, the layup assembly 100 can include the thermoplastic elongated members 120 that are offset one from another in the adjacent layup layers. In other words, the centerlines of the thermoplastic elongated members in one layup layer may be offset from the centerlines of the thermoplastic elongated members in an adjacent layup layer.

In one or more implementations, the thermoplastic elongated members 120 may have uniform or non-uniform orientation within any layup layer 110. In particular, all of the thermoplastic elongated members 120 may be substantially parallel one to another. Alternatively, however, one or more of the thermoplastic elongated members 120 may form various angles with respect to other thermoplastic elongated members 120. For example, one or more thermoplastic elongated members 120 may form a 90° angle with respect to other thermoplastic elongated member within the same layup layer 110.

Similarly, the thermoplastic elongated members 120 located in different and/or adjacent layup layers 110 may have uniform or non-uniform orientation relative to each other. More specifically, thermoplastic elongated members 120 disposed in one layup layer 110 may be parallel to the thermoplastic elongated members 120 disposed in an adjacent layup layer 110. Also, in at least one implementation, the thermoplastic elongated members 120 disposed in one layup layer 110 may form an angle (e.g., a 90° angle) with respect to the thermoplastic elongated members 120 disposed in an adjacent layup layer 110. For example, FIG. 1A illustrates the thermoplastic elongated members 120 of each layup layer 100a, 110b, 110c in the same orientation. In alternative implementations, the thermoplastic elongated members 120 of the middle layup layer 110b can extend 90° relative to the thermoplastic elongated members 120 of the top and bottom layup layers 100a, 110c.

In one or more implementations, the manufacturer can assemble or place the layup assembly 100 in a cell block. For example, referring to FIG. 1B, the manufacturer can place the thermoplastic elongated members 120 within a cell block 130. The cell block 130 can at least partially constrain the thermoplastic elongated members 120 within the layup assembly 100 and the various layup layers 110. For example, in at least one implementation, the cell block 130 includes a base and two sidewalls. The sidewalls can constrain the thermoplastic elongated members within the cell block 130. More specifically, the sidewalls can prevent the thermoplastic elongated members 120 from moving away one from another.

Figure 1B:
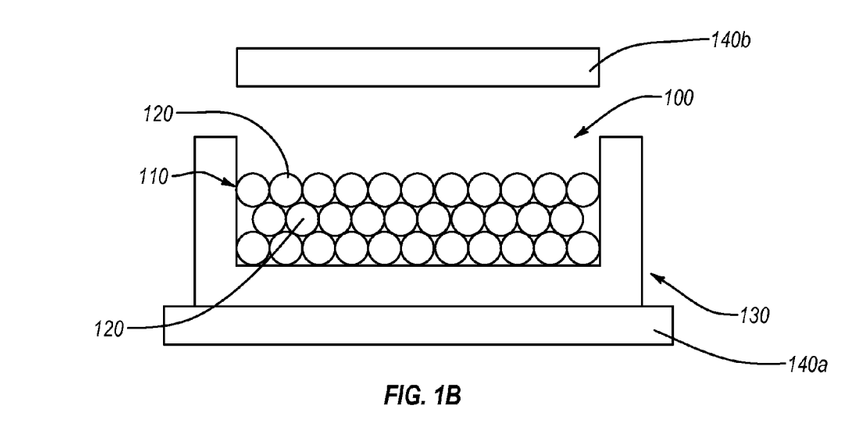
FIG. 1B illustrates an end view of the layup assembly of FIG. 1A between two platens.

Furthermore, FIG. 1B illustrates that the cell block 130 can include two sidewalls and no end walls. Alternatively, however, the cell block 130 can include multiple end walls. In light of this disclosure, those skilled in the art should appreciate that the cell block 130 can have any number of sidewalls, thereby forming any desirable shape of the perimeter of the final architectural thermoplastic panel. Additionally, the cell block 130 may not include a base or any other structure supporting the sidewalls.

Preventing movement of the thermoplastic elongated members 120 can prevent smearing of colors from one thermoplastic rod to another, adjacent thermoplastic rod. In light of this disclosure, one skilled in the art will appreciate that while each rod may have a uniform color, different rods can have differing colors. Hence, the manufacturer can create distinct segments with different colors, formed by the thermoplastic elongated members. Accordingly, as further described below, the manufacturer can produce architectural thermoplastic panels having a reproducible and ordered geometric pattern without substantial smearing, defined by the distinct segments.

Once the manufacturer has prepared the layup assembly 100, the manufacturer can fuse the thermoplastic elongated members 120 to form the architectural thermoplastic panel. More specifically, the manufacturer can use a heated mechanical press or an autoclave to fuse the thermoplastic elongated members 120 together. For instance, a heated mechanical press can press the thermoplastic elongated members 120 together, while heating the layup assembly 100. The heated mechanical press can raise the temperature of the layup assembly 100 using steam, electrical heating elements, hot oil (circulated within platens), etc.

As illustrated in FIG. 1B, the manufacturer can place (or assemble) the layup assembly 100 in a press and apply pressure to and/or heat to the layup assembly 100. For example, the press can include a bottom platen 140a and a top platen 140b. The manufacturer can set the layup assembly 110 and/or the cell block 130 on the bottom platen 140a. Additionally, the manufacturer can lower the top platen 140b and/or raise the bottom platen 140a, such that to apply pressure P to the thermoplastic elongated members 120 and/or to the cell block 130.

Figure 1C:
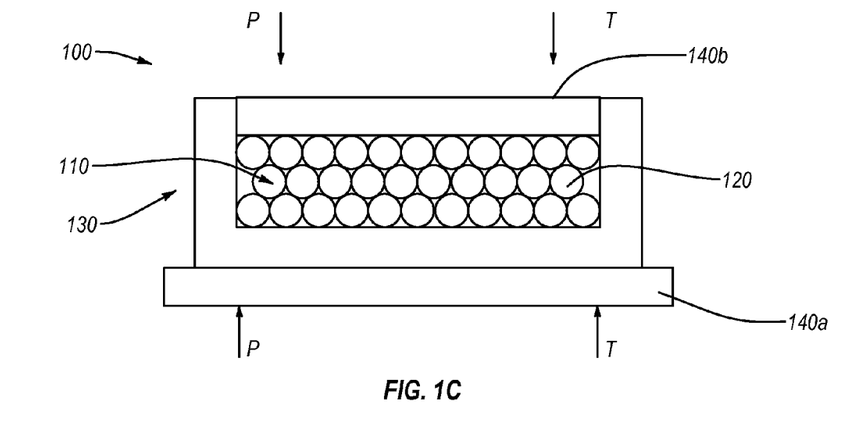
FIG. 1C illustrates an end view of the layup assembly and platens of FIG. 1B, under pressure and at raised temperature in accordance with an implementation of the present invention.

Accordingly, to apply pressure to the layup assembly 100, the manufacturer may size the top platen 140b to fit between one or more sidewalls of the cell block 130, as illustrated in FIGS. 1B-1C. Alternatively, the manufacturer can use an insert or an additional plate that can fit between the sidewalls of the cell block 130. Alternatively, as described below, the platens 140a, 140b can apply pressure to both the cell block 130 and the layup assembly 100.

As described above, the manufacturer can apply heat and pressure to the thermoplastic elongated members 120 to form the architectural thermoplastic panel. More specifically, the manufacturer can raise temperature T of thermoplastic elongated members 120 to near or above the glass transition temperature of the resin material of the thermoplastic elongated members 120. For example, in one or more implementations, the manufacturer can raise the temperature of the thermoplastic elongated members 120 to between about 190° F. and 350° F.

Additionally, the manufacturer also can fuse the thermoplastic elongated members 120 by applying a processing pressure that is between approximately 5 pounds per square inch (psi) and approximately 250 psi (above the atmospheric pressure), and preferably between about 5 psi and about 150 psi. The manufacturer can hold the layup assembly 100 at the desired temperature and pressure for a period of time between about 6 seconds to about 60 minutes. It should be noted, an optimal temperature for bonding may vary depending on the thickness and the type of material(s) comprising the thermoplastic elongated members 120. Thus, in light of this disclosure, one skilled in the art should appreciate that the temperatures and pressures for forming the architectural thermoplastic panel by fusing the thermoplastic elongated members 120 can depend on the particular materials, thicknesses, and arrangements used in the layup assembly 100 as well as on the requirements for the architectural thermoplastic panel (e.g., flatness, thickness tolerance, color smearing, etc).

In alternative implementations, the manufacturer can place the layup assembly 100 in an autoclave to subject the layup assembly 100 to a desired temperature and/or pressure. In particular, such pressure may be below the atmospheric pressure (i.e., vacuum). Accordingly, the manufacturer can fuse together the thermoplastic elongated members 120 thereof by subjecting the layup assembly 100 to a desired pressure and temperature. Additionally, in light of this disclosure, those skilled in the art should appreciate that the manufacturer can press together the thermoplastic elongated members without using the cell block 130.

Hence, by way of example, thermoplastic elongated members can comprise high-density polyethylene (HDPE). In such implementations, the manufacturer can hold the HDPE thermoplastic elongated members 120 near, at, or above the glass transition point of HDPE for thirty to sixty (30-60) minutes. More specifically, the manufacturer can heat the thermoplastic elongated members to a temperature of 320° F. and can apply pressure to the thermoplastic elongated members 120 to a pressure of 150 psi.

As a result of the applied pressure and heat, the thermoplastic elongated members 120 can fuse together, forming the architectural thermoplastic panel. Following the heating and pressurizing of the thermoplastic elongated members 120, the fused thermoplastic elongated members 120 can cool to room temperature. In particular, the manufacturer can hold the fused layup layer(s) 110 rigid (or under pressure) at a temperature of about 50° F. to about 120° F. and a pressure of about 1 to about 120 psi, such that the fused thermoplastic elongated members 120 cool below the glass transition temperature of the thermoplastic resin material comprising the thermoplastic elongated members 120.

Figure 1D:
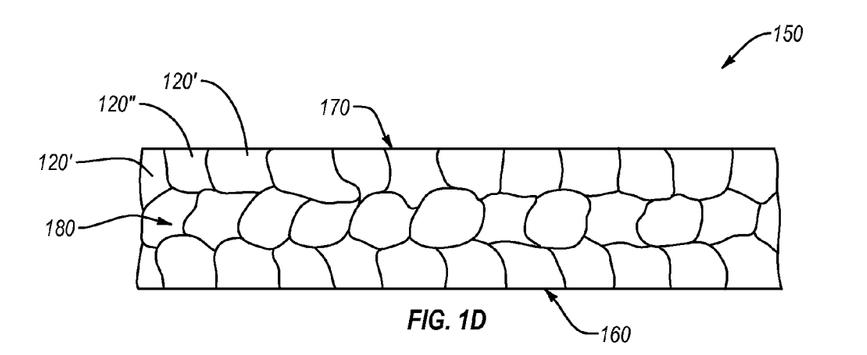
FIG. 1D illustrates an end view of an architectural thermoplastic panel formed from the layup assembly of FIG. 1A in accordance with an implementation of the present invention.
Figure 1E:
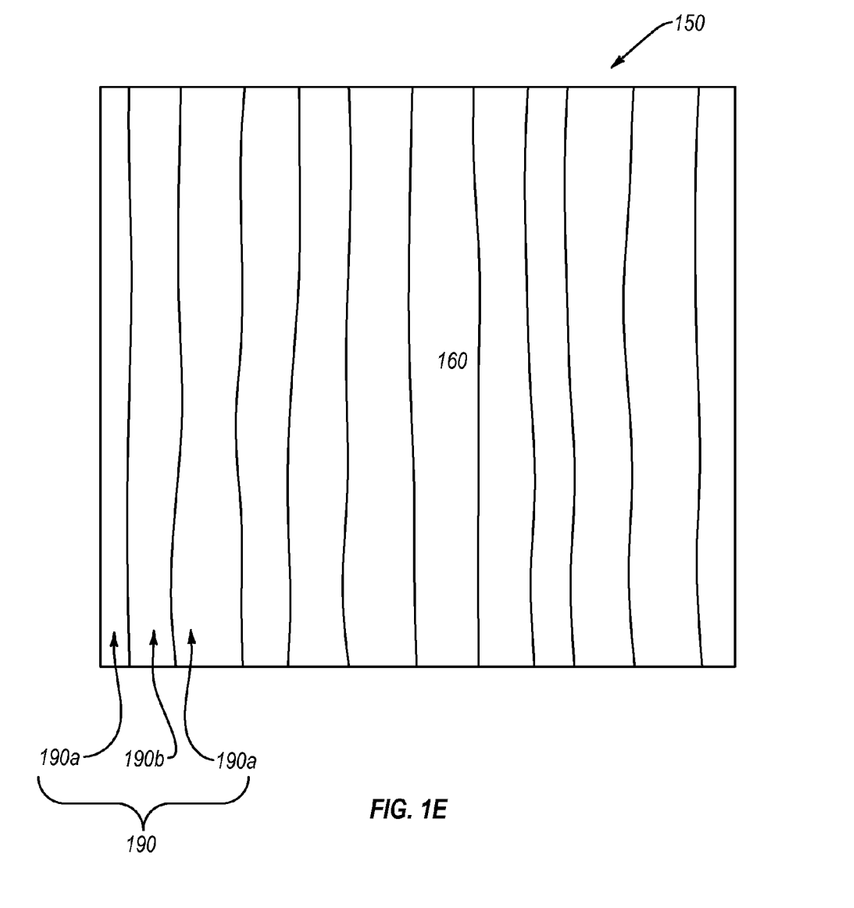
FIG. 1E illustrates a top view of the architectural thermoplastic panel of FIG. 1D.

Once cooled below the glass transition temperature, the layup layers 110 can form an architectural thermoplastic panel 150, as illustrated in FIGS. 1D and 1E. Particularly, the architectural thermoplastic panel 150 can include fused virgin or recycled thermoplastic rods 120', 120", which can form at least one surface (e.g., a front surface 160 and/or a back surface 170) of the architectural thermoplastic panel 150. Furthermore, the thermoplastic elongated members, such as the fused recycled thermoplastic rods 120', 120" can form an inner portion 180 of the architectural thermoplastic panel 150.

As described above, the thermoplastic elongated members 120 can have solid colors throughout. Thus, in at least one implementation, a front and/or back surfaces 160, 170 of the architectural thermoplastic panel 150 can include multiple segments 190 of two or more different colors. For example, fused virgin or recycled thermoplastic rods 120' can have a first solid color throughout (e.g., can be white throughout), and the fused recycled thermoplastic rods 120" can have a second solid color throughout (e.g., can be green throughout). Therefore, the fused virgin or recycled thermoplastic rods 120', 120" can form respective segments 190a, 190b on the front and/or back surfaces 160, 170 of the architectural thermoplastic panel 150.

In at least one implementation, the segments 190 can have substantially linear shapes. Additionally, as described above, by restraining movement of the virgin or recycled thermoplastic rods 120, for example, by using the cell block 130 (FIGS. 1B-1C), the manufacturer can minimize smearing of colors between adjacent fused thermoplastic rods 120', 120" (during the fusing thereof). Accordingly, the manufacturer can fabricate architectural thermoplastic panels 150 that have substantially predictable and reproducible segments 190, which may have linear shapes. Furthermore, the linear segments 190 can have substantially clearly defined borders, separating one segment 190 from adjacent segments 190. In other words, for instance, the front surface 160 of the architectural thermoplastic panel 150 can have segments 190a, 190b clearly defined by the respective colors of the fused thermoplastic rods 120' and 120".

Additionally, the thermoplastic elongated members 120 can define a pattern visible on the exposed ends of the architectural thermoplastic panel 150. For example, the fused thermoplastic elongated members 120' and 120" (when rods) can form a pattern of approximately circular shapes (FIG. 1D). Furthermore, the patterns of approximately circular shapes can have different colors formed by the fused thermoplastic rods 120', 120".

In at least one implementation, as described above, the manufacturer can use elongated members comprising virgin thermoplastic resin as well as other materials. More specifically, the manufacturer can incorporate elongated members comprising metal, glass, etc., into the architectural thermoplastic panel 150. For instance, the manufacturer can fuse and or bind metal rods within the inner portion 180 of the architectural thermoplastic panel 150.

Accordingly, the architectural thermoplastic panel 150 can incorporate elongated members that have higher tensile and/or compressive strength then thermoplastic resin material and/or recycled thermoplastic resin material, comprising one or more elongated members (e.g., fused thermoplastic rods 120', 120"). Hence, incorporating elongated members that have higher strength than, for example, fused thermoplastic rods 120', 120" can strengthen the architectural thermoplastic panel 150. Moreover, builders and/or architects can incorporate the strengthened architectural thermoplastic panels 150 into structures within the building that may require such additional strength.

In any event, as shown by FIG. 1E, the use of rods can create a substantially consistent pattern of color, as expressly selected by the manufacturer during the layup process. During fusion, however, the rods can exhibit some movement relative to one another, which can create some minor inconsistencies in pattern, and which can cause some incidental or minor smearing. Thus, fusing bundles of rods can greatly improve a manufacturer's ability to create patterns when compared to pressing flakes or pellets into panels.

Figure 2A:
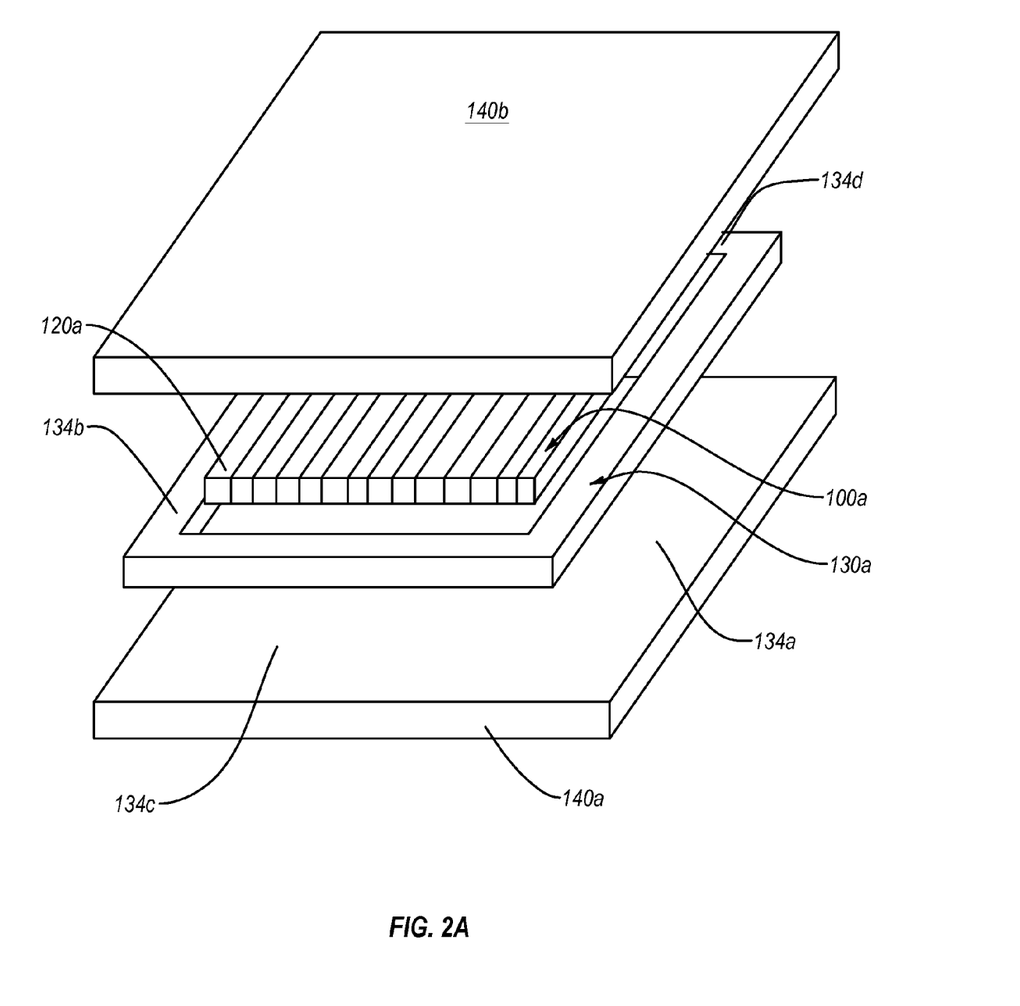
FIG. 2A illustrates an exploded perspective view of a layup assembly between two platens in accordance with another implementation of the present invention.
Figure 2B:
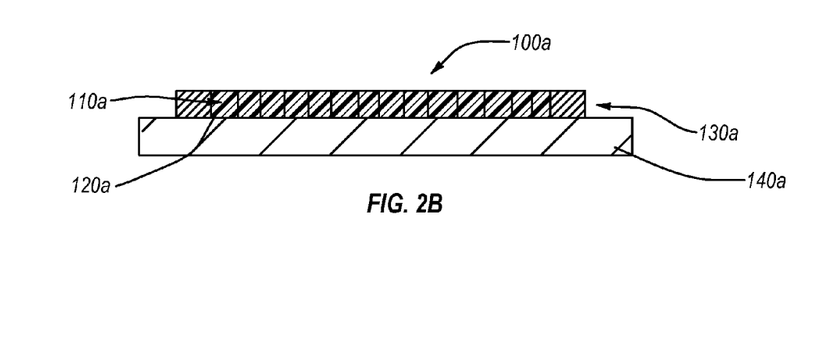
FIG. 2B illustrates a cross-sectional view of the layup assembly and platens of FIG. 2A.

As described above, the thermoplastic elongated members can comprise virgin or recycled thermoplastic rods 120 (FIGS. 1A-1C). As previously noted, implementations of this disclosure are not so limited. For instance, as illustrated in FIGS. 2A-2B, the thermoplastic elongated members also can include bars (e.g., rectangular bars), such as virgin or recycled thermoplastic bars 120a. In particular, the manufacturer can form a layup assembly 100a of recycled thermoplastic elongated members in the form of bars 120a. In at least one implementation, the recycled thermoplastic bars 120a form a single layup layer, as illustrated in FIGS. 2A and 2B.

Unlike rods, which can exhibit some movement relative to one another during heating and pressing, rectangular bars substantially retain their position relative to one another and are much easier to arrange during lay-up as they can be set in place. Thus, use of bars substantially eliminates any problems associated with shifting/smearing. A manufacturer can thereby produce panels having the same pattern, with a single source material and in a single step.

In at least one implementation, the manufacturer can place the layup assembly of 100a of thermoplastic elongated members 120a in the form of bars in a cell block 130a. For instance, as illustrated in FIG. 2A, the cell block 130a can have four sidewalls 134a, 134b, 134c, 134d. Thus, the sidewalls 134a, 134b, 134c, 134d can form the perimeter of the final architectural thermoplastic panel. In other words, the cell block 130a can comprise a frame that extends about and constrains the each side of the layup assembly 110a. As such, the cell block 130a may not include a base or top surface that covers the thermoplastic elongated members 120a.

Figure 2C:
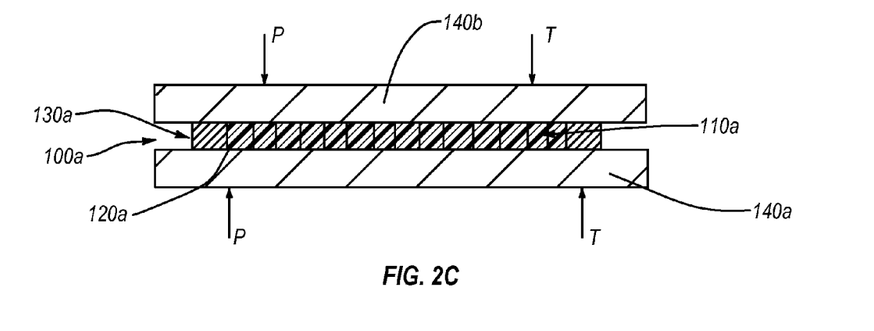
FIG. 2C illustrates a cross-sectional view of the layup assembly and the platens of FIG. 2A, under pressure and at raised temperature in accordance with an implementation of the present invention.

In one or more implementations, the cell block 130a can comprise flexible or compressible material, which can deflect and/or deform under pressure. For example, the cell block 130a can comprise silicone. Thus, as illustrated by FIG. 2C the manufacturer can apply temperature T and pressure P to the layup assembly 100a by pressing over the sidewalls 134a, 134b, thereby deforming the sidewalls 134a, 134b and compressing the thermoplastic elongated members 120a together. As described above, the sidewalls 134a, 134b of the flexible cell block 130 can prevent and/or restrain movement of the thermoplastic elongated members 120a. Thus, the cell block 130a can provide shape to the final architectural thermoplastic panel and can prevent the thermoplastic elongated members from spreading out under an applied pressure.

Figure 2D:
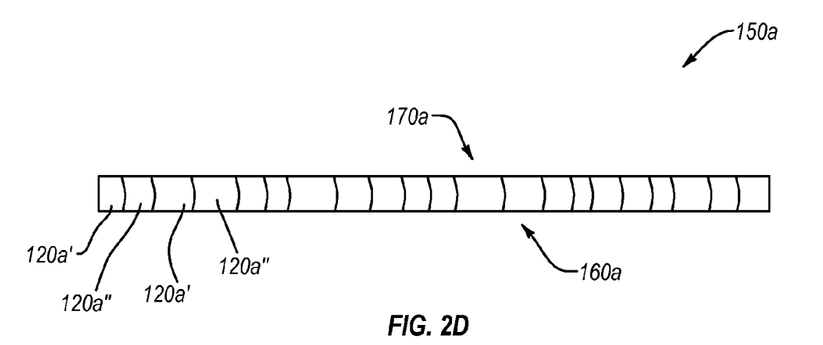
FIG. 2D illustrates an end view of an architectural thermoplastic panel formed from the layup assembly of FIG. 2A in accordance with an implementation of the present invention.
Figure 2E:
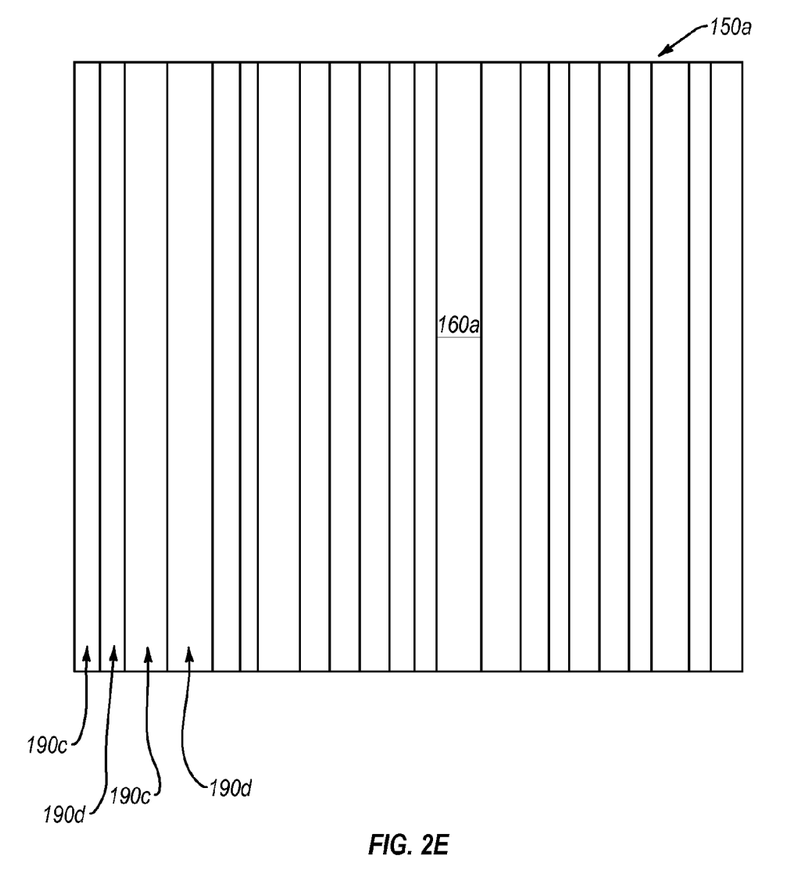
FIG. 2E illustrates a top view of the architectural thermoplastic panel of FIG. 2D.

Accordingly, as illustrated in FIGS. 2D and 2E, the manufacturer can form an architectural thermoplastic panel 150a that has one or more fused thermoplastic bars 120a', 120a". Similar to the thermoplastic elongated members 120 (i.e., virgin and/or recycled thermoplastic rods), the architectural thermoplastic panel 150a can incorporate fused thermoplastic bars 120a' of a first color (e.g., white) and fused thermoplastic bars 120a" of a second color (e.g., green). Thus, the fused thermoplastic bars 120a', recycled thermoplastic bars 120a" can form multiple segments on one or more surfaces of the 150a (e.g., on a front surface 160a or back surface 170a).

The multiple colored segments on the front and/or back surfaces 160a, 170a can form or define a desired pattern. For instance, the first color of the fused recycled thermoplastic bars 120a' can define one or more segments 190c, and the second color of the recycled thermoplastic bars 120a" can define one or more segments 190d. As described above, such pattern can have substantially linear shapes defined by the colored segments. Furthermore, borders between the colored segments can be substantially clear and definite, without smearing of the first color from one segment onto another (e.g., from segment 190c onto the segment 190d, and vice versa). Alternatively, thermoplastic bars 120a' of the same color can fuse together can appear as wider segments.

Figure 3A:
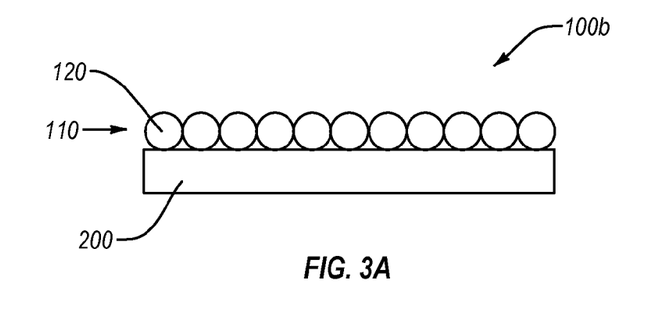
FIG. 3A illustrates an end view of a layup assembly in accordance with yet another implementation of the present invention.
Figure 3B:
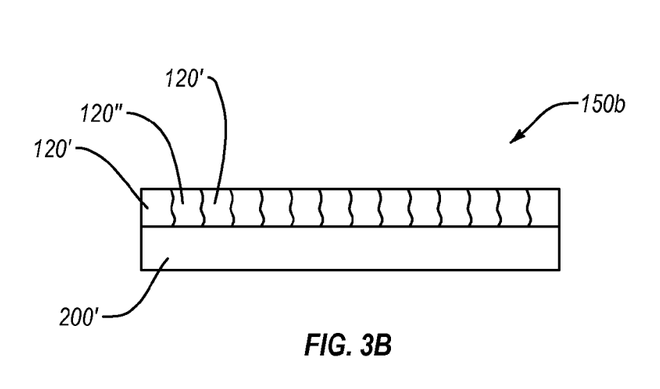
FIG. 3B illustrates an end view of an architectural thermoplastic panel formed from the layup assembly of FIG. 3A in accordance with an implementation of the present invention.

Furthermore, as described above, the layup assembly 100, 100a as well as the final architectural thermoplastic panel can include other elements. For instance, as illustrated in FIGS. 3A-3B and 4A-4B, the layup assembly as well as the final architectural thermoplastic panel can include a thermoplastic resin sheet 200. More specifically, as illustrated in FIGS. 3A-3B, a layup assembly 100b can include a thermoplastic resin sheet 200 and a layup layer 110 that comprises multiple thermoplastic elongated members 120 (i.e., virgin and/or recycled thermoplastic rods).

Accordingly, the manufacturer can apply heat and pressure, as described above, to fuse the thermoplastic elongated members 120 (i.e., virgin and/or recycled thermoplastic rods) one to another as well as to the thermoplastic resin sheet 200. Once fused, the thermoplastic elongated members 120 (i.e., virgin and/or recycled thermoplastic rods) and the thermoplastic resin sheet 200 can form an architectural thermoplastic panel 150b. The architectural thermoplastic panel can comprise a plurality of fused thermoplastic rods 120', 120" and one or more fused thermoplastic resin sheets 200'. Furthermore, as noted above, the fused thermoplastic rods 120', 120" can have two or more different colors, thereby forming different colored segments on one or more surfaces of the architectural thermoplastic panel 150b.

The thermoplastic panel 150b can comprise a single or multi-layer substrates or sheets formed from thermoplastic polymers (or alloys thereof). Specifically, such materials include but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like. Furthermore, the thermoplastic panel 150b can include other thermoplastic polymers or thermoplastic polymer blends, or combinations and mixtures thereof. In addition, any given thermoplastic panel 150b can include one or more resin-based substrates and any number other layers or coatings. In one or more implementations, the thermoplastic panel 150b comprises recycled post-consumer materials (such as HDPE).

One will appreciate that by applying only one layer of thermoplastic elongated members 120 (i.e., virgin and/or recycled thermoplastic rods) the manufacturer is able to control the arrangement and pattern of the rods to a higher degree of precision. Furthermore, because there is only a single layer of rods, the manufacturer can reduce or virtually eliminate the possibility that rods will move or shift during the heating and pressing process. One will appreciate that the heating and pressing process can be substantially similar to the process described herein above, and use similar temperatures and pressures. As illustrated by FIG. 3B, the resulting pattern exhibits a high level of uniformity, and eliminates much of the shifting/smearing that can occur with multiple layers of rods. Thus, the manufacturing process of FIGS. 3A-3B offers improved uniformity of pattern and the ability to consistently produce panels having the same pattern.

Figure 4A:
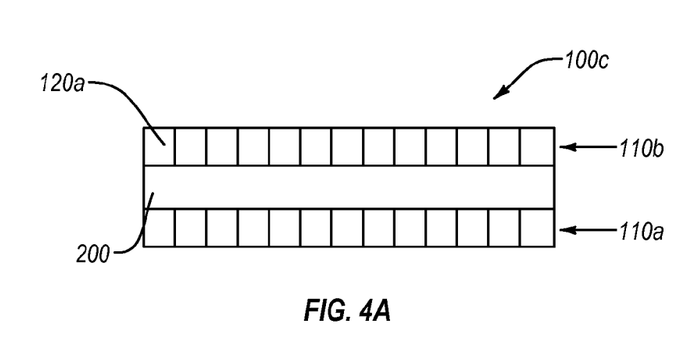
FIG. 4A illustrates an end view of another layup assembly in accordance with an implementation of the present invention.
Figure 4B:
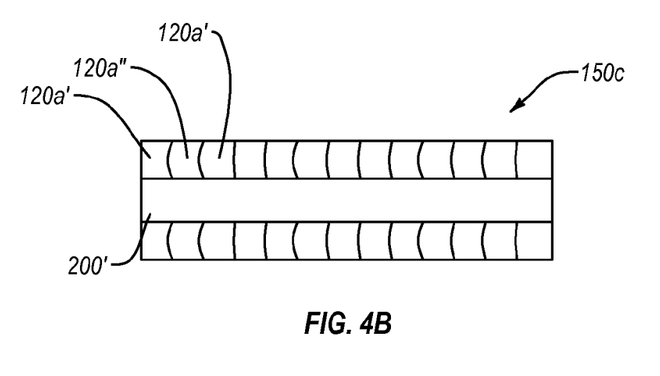
FIG. 4B illustrates an end view of an architectural thermoplastic panel formed from the layup assembly of FIG. 4A in accordance with an implementation of the present invention.

Similarly, as illustrated in FIGS. 4A-4B, a layup assembly 100c can include thermoplastic resin sheet 200 and the layup layers 110a, 110b, which can comprise multiple thermoplastic elongated members, such as the recycled thermoplastic bars 120b. The thermoplastic elongated members (e.g., the virgin or recycled thermoplastic bars 120b) can surround the thermoplastic resin sheet 200 on two sides. Thus, the manufacturer can apply heat and pressure, as described above, to fuse the recycled thermoplastic bars 120a of each layup layer 110a, 110b to one to another as well as to the thermoplastic resin sheet 200.

Once fused, the thermoplastic bars 120a and the thermoplastic resin sheet 200 can form an architectural thermoplastic panel 150c, comprising a plurality of fused recycled thermoplastic bars 120a', 120a" and one or more fused thermoplastic resin sheets 200'. Furthermore, as noted above, the fused thermoplastic bars 120a', 120a" can have two or more different colors, thereby forming different colored segments on one or more surfaces of the architectural thermoplastic panel 150c. Additionally, in at least one implementation, the architectural thermoplastic panels 150b, 150c (FIGS. 3B, 4B) can comprise 100% recycled thermoplastic resin materials. In one or more implementations, architectural thermoplastic panels in accordance with the present invention can have about 60%, 65%, 70%, 75%, 80%, 85%, 90%, 95%, or about 100% by weight (or alternatively by volume) of post-consumer recycled content.

A builder can use the architectural thermoplastic panels for forming partitions, barriers, dividers, support surfaces, and combinations thereof. The architectural thermoplastic panels can be flat or can have three-dimensional formations, such as curved, bent, or otherwise shaped. The manufacturer can fabricate the architectural thermoplastic panels in standard sizes or in custom sizes, as ordered by the customer.

Typical sizes made available to or desired by customers may vary between large 5'×10' sheets down to 6"×6" tiles or smaller. During the manufacturing process, the laminate sheets may be formed larger than the standard or customer defined sizes that are eventually sold. This can be due to the size of the manufacturing equipment used to create the laminate sheets, or because of a desire to trim the excess material in order to create a clean edge on the final product, creating straight, rectangular panels prior to shipping the product to the customer.

Figure 5:
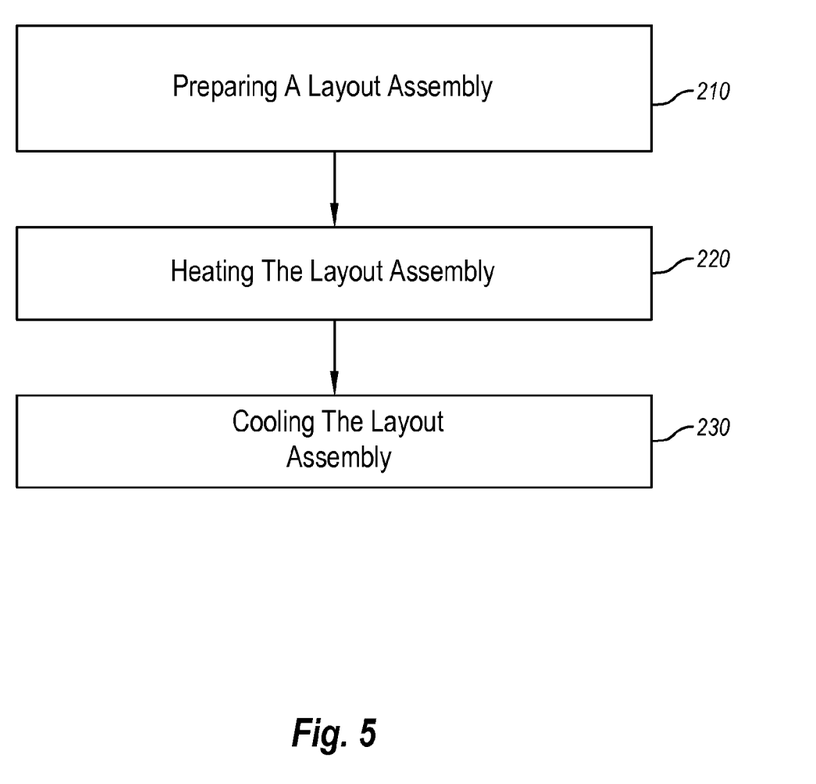
FIG. 5 illustrates a flow chart of a method for forming an architectural thermoplastic panel in accordance with an implementation of the present invention.

Accordingly, FIGS. 1A-4B and the corresponding text provide a number of different components and mechanisms for creating architectural thermoplastic panels in an efficient, aesthetically pleasing way. In addition to the foregoing, implementations of the present invention can also be described in terms of flowcharts comprising acts and steps in a method for accomplishing a particular result. For example, FIG. 5 illustrates a flowchart of one exemplary method for producing the architectural thermoplastic panels 150, 150a, 150b, 150c using principles of the present invention. The acts of FIG. 5 are described below with reference to the components and diagrams of FIGS. 1A through 4B.

For example, FIG. 5 shows that a method of creating architectural thermoplastic panels 150, 150a, 150b, 150c comprises an act 210 of preparing a layup assembly 100, 100a, 100b, 100c. Act 210 includes positioning one or more thermoplastic elongated members (e.g., virgin and/or recycled thermoplastic rods or virgin and/or recycled thermoplastic bars) in one or more layup layers 110. More specifically, in at least one implementation act 210 includes laying out a plurality of thermoplastic elongated members 120, 120a, wherein one or more thermoplastic elongated members 120, 120a of the plurality of thermoplastic elongated members 120, 120a comprises recycled thermoplastic resin material. For instance, the manufacturer can position or lay out the thermoplastic elongated members 120, 120a in a cell bock 130, 130a, which may at least partially restrain the thermoplastic elongated members 120, 120a from movement. Additionally or alternatively, the manufacturer can position one or more sheets of thermoplastic material 200 above and/or below any layup layer 110, within the layup assembly 100.

In addition, FIG. 5 shows that the method can comprise an act 220 of heating the layup assembly 100, 100a, 100b, 100c. Act 220 includes heating the layup assembly 100 to a processing temperature at least as great as the glass transition temperature of the thermoplastic elongated members 120, 120a. In connection with act 220, the thermoplastic elongated members fuse one to another and/or to the thermoplastic sheet 200 if included in the layup assembly 100, 100a, 100b, 100c. For example, the manufacturer can heat the layup assembly 100, 100a, 100b, 100c to a temperature of between about 190° F. and 350° F., such as to a temperature of about 225° F. The manufacturer can heat the layup assembly in a press (e.g., a lamination press), autoclave, vacuum bag, oven, or other thermosetting environment. In an autoclave or oven, a manufacturer may further perform the lamination by inserting the above-described layup assembly into a vacuum bag.

FIG. 5 also shows that the method comprises act 230 of cooling the layup assembly. Act 230 can include cooling the layup assembly below the glass transition temperature of the thermoplastic material comprising the thermoplastic elongated members 120, 120a. For example, a manufacturer can place the layup assembly 100, 100a, 100b, 100c into a cold press or can simply position the layup assembly 100, 100a, 100b, 100c so that ambient air can cool the layup assembly 100, 100a, 100b, 100c. Upon cooling, thermoplastic elongated members 120, 120a can harden and form a mechanical and/or chemical bonds one with another as well as any thermoplastic resin sheet 200 included in the layup assembly.

As mentioned above, implementations of the present invention are not limited to those shown and described herein above. For example, the implementations shown and described above include thermoplastic elongated members 120, 120a that extend the entire length of a layup assembly 100, 100a, 100b, 100c, and thus, resultant panel. In alternative implementations, the thermoplastic elongated members 120, 120a can span only a portion of the length of a given panel.

Still further in one or more implementation the resultant the architectural thermoplastic panels 150b, 150c can comprise various layers whether they be multiple layup layers of thermoplastic elongated members (see e.g., FIG. 1D) or one or more layup layers and a thermoplastic resin sheet (see e.g., FIGS. 3B and 4B). Such multi-layered architectural thermoplastic panels can comprise individual layers formed using the methods described above that are then fused together in a separate thermosetting process or that are laminated together using an adhesive.

Accordingly, the schematics and methods described herein provide a number of unique products, as well as ways for creating aesthetically pleasing, decorative, architecturally-suitable panels. As discussed herein, these architectural thermoplastic panels can have substantially reproducible pattern. In particular, fused elongated members, such as elongated members comprising recycled thermoplastic resin, can define such reproducible patterns. Accordingly, implementations can allow the manufacturer to incorporate recycled materials into architectural thermoplastic panels, which have ordered, reproducible, and clear patterns.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An architectural thermoplastic panel comprising:
    a plurality of solid thermoplastic elongated members fused together, wherein the plurality of solid thermoplastic elongated members comprise:
        a first solid thermoplastic elongated member having a first color and being formed of a single, solid, and generally uniform material through a cross-section thereof; and
        at least a second solid thermoplastic elongated member having a second color differing from the first color and being formed of a single, solid, and generally uniform material through a cross-section thereof, wherein:
            both the first and second solid thermoplastic elongated members have a single identical glass transition temperature;
            the first and the second solid thermoplastic elongated members abut each other and are fused together along their lengths;
            the first and the second colors do not bleed into each other; and
            each solid thermoplastic elongated member of the plurality is oriented and extends from one end to an opposing end of the entire length or width of the architectural thermoplastic panel, wherein the solid thermoplastic elongated members are displayed as an outside decorative surface of the thermoplastic panel.

2. The architectural thermoplastic panel as recited in claim 1, wherein the solid thermoplastic elongated members comprise a recycled thermoplastic resin material.

3. The architectural thermoplastic panel as recited in claim 1, further comprising a thermoplastic sheet fused to the plurality of solid thermoplastic elongated members.

4. The architectural thermoplastic panel as recited in claim 3, wherein the thermoplastic sheet fused to the plurality of solid thermoplastic elongated members forms at least one surface of the architectural thermoplastic panel.

5. The architectural thermoplastic panel as recited in claim 1, wherein the at least two different colors of the solid thermoplastic elongated members define an elongated color that extends the entire length or width of at least one surface of the architectural thermoplastic resin panel, wherein a pattern of the architectural thermoplastic resin panel comprises a plurality of sections.

6. The architectural thermoplastic panel as recited in claim 5, wherein color from any section is not smeared onto any adjacent section.

7. The architectural thermoplastic panel as recited in claim 1, wherein the thermoplastic elongated members comprise resin rods having circular cross-section shapes.

8. The architectural thermoplastic panel as recited in claim 1, wherein the thermoplastic elongated members comprise bars.

9. The architectural thermoplastic panel as recited in claim 1, wherein the architectural thermoplastic panel comprises 100 percent post-consumer recycled material.

10. The architectural thermoplastic panel as recited in claim 1, further comprising one or more non-thermoplastic elongated members fused between the plurality of solid thermoplastic elongated members.

11. The architectural thermoplastic panel as recited in claim 10, wherein the one or more non-thermoplastic elongated members are formed of metal or glass.

12. The architectural thermoplastic panel as recited in claim 10, wherein the one or more non-thermoplastic elongated members have a higher tensile or compressive strength than the plurality of solid thermoplastic elongated members.

13. An architectural thermoplastic panel comprising:
a plurality of solid thermoplastic elongated members fused together, wherein the plurality of solid thermoplastic elongated members comprise:
a first solid thermoplastic elongated member being formed of a single, solid, and generally uniform material through a cross-section thereof, the first solid thermoplastic elongated member extends from a top end to a bottom end of the architectural thermoplastic panel; and
a second solid thermoplastic elongated member being formed of a single, solid, and generally uniform material through a cross-section thereof, wherein:
both the first and second solid thermoplastic elongated members have a single identical glass transition temperature;
the first and the second solid thermoplastic elongated members abut each other and are fused together along their lengths; and
both the first and second solid thermoplastic elongated members are viewable on a facing surface of the architectural thermoplastic panel as well as a cross-section thereof, wherein at least some of the thermoplastic resin members are displayed at an outside surface of the architectural thermoplastic panel.

14. The architectural thermoplastic panel as recited in claim 13, further comprising a thermoplastic sheet having a first side fused to a first side of the fused together first and second solid thermoplastic elongated members.

15. The architectural thermoplastic panel as recited in claim 14, wherein the plurality of solid thermoplastic members further comprise fused together third and fourth solid thermoplastic elongated members, the third and fourth solid thermoplastic elongated members being fused to a second side of the thermoplastic sheet opposite the first and second solid thermoplastic elongated members.

16. The architectural thermoplastic panel as recited in claim 13, wherein the first solid thermoplastic elongated member has a first color and the second solid thermoplastic elongated member has a second color differing from the first color.

17. The architectural thermoplastic panel as recited in claim 16, wherein the first and the second colors do not bleed into each other.

18. An architectural thermoplastic panel comprising:
a plurality of solid thermoplastic elongated members fused together, wherein the plurality of solid thermoplastic elongated members comprise:
at least a first solid thermoplastic elongated member having a first color, and being formed of a single, solid, and generally uniform material through a cross-section thereof, the first solid thermoplastic elongated member extends from one end of the architectural thermoplastic panel to an opposing end; and
at least a second solid thermoplastic elongated member having a second color differing from the first color, and being formed of a single, solid, and generally uniform material through a cross-section thereof, the second solid thermoplastic elongated member extends from one end of the architectural thermoplastic panel to the opposing end;
wherein:
each solid thermoplastic elongated member of the plurality provides a linear segment pattern along the entire length or width of the architectural thermoplastic panel that is defined by a length, width, and color of the solid elongated member; and
the pattern provided by the length, width, and color of the first solid thermoplastic elongated member is different from the pattern provided by the length, width, and color of the second solid thermoplastic elongated member, wherein the solid thermoplastic elongated members are displayed as an outside decorative surface of the thermoplastic panel.

19. The architectural thermoplastic panel as recited in claim 18, wherein each of the solid thermoplastic elongated members comprise a recycled thermoplastic resin material.

20. The architectural thermoplastic panel as recited in claim 18, further comprising a thermoplastic sheet fused to the plurality of solid thermoplastic elongated members.

21. The architectural thermoplastic panel as recited in claim 20, wherein the thermoplastic sheet comprises a different glass transition temperature than that of the solid thermoplastic elongated members.

22. The architectural thermoplastic panel as recited in claim 21, wherein the thermoplastic sheet is fused between the plurality of solid thermoplastic elongated members, such that the plurality of solid thermoplastic elongated members are fused on opposing side of the thermoplastic sheet.

23. The architectural thermoplastic panel as recited in claim 18, wherein the architectural thermoplastic panel comprises 100 percent post-consumer recycled thermoplastic material.

24. The architectural thermoplastic panel as recited in claim 18, further comprising:
   one or more non-thermoplastic elongated members incorporated between the plurality of fused solid thermoplastic elongated members;
   wherein the one or more non-thermoplastic elongated members have a higher tensile or compressive strength than the plurality of solid thermoplastic elongated members.

* * * * *